United States Patent Office 2,962,460
Patented Nov. 29, 1960

2,962,460
COATING COMPOSITIONS
Earl C. Chapin, Springfield, Mass., and Richard F. Smith, Albany, N.Y., assignors to Monsanto Chemical Company, St. Louis, Mo., a corporation of Delaware
No Drawing. Filed Dec. 3, 1959, Ser. No. 856,928
5 Claims. (Cl. 260—21)

This invention relates to coating compositions which include therein new terpolymers. More particularly, this invention relates to coating compositions which include therein terpolymers containing free carboxyl groups and free hydroxyl groups.

An object of this invention is to provide coating compositions which include therein new terpolymers.

A further object of this invention is to provide coating compositions which include therein terpolymers containing both free carboxyl groups and free hydroxyl groups.

These and other objects of the present invention are attained by preparing coating compositions which include therein interpolymers prepared by interpolymerizing an allyl alcohol compound with a vinyl ester of a monocarboxylic acid and an alpha,beta-ethylenically unsaturated monocarboxylic acid.

The following examples are set forth to illustrate more clearly the principle and practice of this invention to those skilled in the art. All parts are by weight.

EXAMPLE I

A mixture of 75 parts of vinyl acetate, 20 parts of allyl alcohol, 5 parts of crotonic acid and 3 parts of di-tertiary butyl peroxide is charged to a sealed reaction vessel and heated for 0.5 hour at 180° C. The product obtained consists of 48 parts of a viscous liquid polymer dissolved in unreacted monomers. The unreacted monomers are removed by vacuum distillation and the recovered polymer analyzes approximately 82% vinyl acetate, 10% allyl alcohol and 8% crotonic acid.

EXAMPLE II

Example I is repeated except that the monomers charged to the reaction consist of 71 parts of vinyl acetate, 19 parts of allyl alcohol and 10 parts crotonic acid. The polymer obtained analyzes approximately 84% vinyl acetate, 9% allyl alcohol and 7% crotonic acid.

EXAMPLE III

Example I is repeated except that the monomers charged to the reaction consist of 50 parts of vinyl acetate, 47 parts of allyl alcohol and 3 parts of crotonic acid. The polymer obtained contains a higher percentage of allyl alcohol than the products of Examples I and II.

EXAMPLE IV

A mixture of 70 parts of vinyl pelargonate, 21 parts of allyl alcohol, 9 parts of crotonic acid and 3 parts of ditertiary butyl peroxide are charged to a sealed reaction vessel and heated for 0.5 hour at 200° C. Sixteen parts of polymer are obtained which analyzes approximately 84% vinyl pelargonate, 7% allyl alcohol and 9% crotonic acid.

EXAMPLE V

Example IV is repeated except that the monomer mixture charged consists of 75 parts vinyl pelargonate, 23 parts allyl alcohol and 2 parts crotonic acid. The polymer obtained analyzes approximately 89% vinyl pelargonate, 8% allyl alcohol and 3% crotonic acid.

The three components of the terpolymers included in the coating compositions of this invention are (1) an allyl alcohol compound of the group consisting of allyl alcohol, methallyl alcohol and mixtures thereof, (2) a vinyl ester of a monocarboxylic acid and (3) an alpha, beta-ethylenically unsaturated monocarboxylic acid. The vinyl ester included in the terpolymers may be the ester of essentially any 1–20 carbon atom monocarboxylic acid that is free of olefinic and/or acetylenic unsaturation, but preferably is a vinyl ester of a saturated aliphatic carboxylic acid such as vinyl acetate, vinyl propionate, vinyl pelargonate, vinyl stearate, etc., or a vinyl ester of an aromatic carboxylic acid such as vinyl benzoate. Examples of the alpha,beta-ethylenically unsaturated monocarboxylic acids that may be incorporated in the terpolymers include acrylic acid, methacrylic acid, crotonic acid, cinnamic acid, etc. Mixtures of suitable vinyl esters or alpha,beta-ethylenically unsaturated acids may be employed in lieu of single components if desired.

The terpolymers included in the coating compositions of this invention contain 1–40 weight percent of the allyl alcohol compound, 30–95 weight percent of the vinyl ester of the monocarboxylic acid, and 1–50 weight percent of the alpha,beta-ethylenically unsaturated monocarboxylic acid. In a preferred embodiment of the invention the terpolymers contain 1–10 weight percent of the allyl alcohol component, 1–10 weight percent of the alpha,beta-ethylenically unsaturated monocarboxylic acid and the balance the vinyl ester of a monocarboxylic acid.

In the preparation of the terpolymers included in the coating compositions of this invention, the three monomer components should be mixed together either with or without an organic solvent that is inert to the reactants. Preferably, 0.1–5 parts of a free radical generating polymerization initiator will be incorporated in each 100 parts of the monomer mixture. Examples of such initiators include ditertiary butyl peroxide, benzoyl peroxide, tertiary butyl perbenzoate, etc. The reaction mixture should be heated in a closed pressure-resistant reaction vessel to a temperature of 100–250° C. under autogeneous pressure. The reaction should be run for periods of 15 to 75 minutes to obtain conversions ranging from 30% to 70% depending upon the particular reaction conditions chosen.

The products of the polymerization step are generally syrupy liquids which comprise a solution of the desired terpolymer in unreacted monomers and solvent if a solvent is used. The terpolymer is easily recovered from such syrups by removing the unreacted monomers and solvent by vacuum distillation or by other conventional drying techniques. The terpolymers range in physical properties from viscous liquids to hard colorless brittle resins.

The coating compositions of this invention comprise an organic solvent solution of a resin mixture consisting essentially of 10–90 and preferably 50–90% by weight of a terpolymer of the type as described above and, correspondingly, 90–10 and preferably 50–10 by weight percent of a coating resin of the group consisting of an alkyd resin, an epoxy resin, a phenol-formaldehyde resin, a melamine-formaldehyde resin, a urea-formaldehyde resin and mixtures thereof. The preferred coating compositions contain 50–90% by weight of the terpolymer and, correspondingly, 50–10% by weight of an alkyl ether of a methylol melamine.

The terpolymers included in the coating compositions of the invention can be used as prepared or a portion of the hydroxyl groups thereof can be esterified with an unsaturated fatty acid containing 12–20 carbon atoms in its structure. Such fatty acids normally are derived from drying and semi-drying oils such as linseed oil, soybean oil, coconut oil, cottonseed oil, etc. Where the terpolymers are esterified, they are preferably esterified with 10–80% of the stoichiometrically equivalent quantity of fatty acid.

The alkyd, epoxy, phenol-formaldehyde, melamine-formaldehyde and urea-formaldehyde coating resins included in the coating compositions are well-known in the art. The alkyd resins are condensates of polyhydric alcohols such as glycols, glycerol, sorbitol, pentaerythritol, etc. with polybasic acids or anhydrides thereof, e.g., phthalic acid, phthalic anhydride, isophthalic acid, maleic acid, maleic anhydride, fumaric acid, adipic acid, azelaic acid, etc. These alkyd resins are preferably modified with drying, semi-drying and non-drying oils such as coconut oil, castor oil, dehydrated castor oil, soybean oil, tung oil, or the acids and glycerides derived therefrom. The oil-modified alkyd resins having the best balance of properties for inclusion in the protective coating compositions of the invention are those in which the fatty acid moiety constitutes 30–70 and preferably 30–40 weight percent of the resin. The epoxy resins are formed by reacting epichlorohydrin with polyhydric alcohols such as glycols and glycerol or dihydric phenols and particularly bisphenol A. If desired, the epoxy resins can be partially esterified with saturated or unsaturated fatty acids containing 12–20 carbon atoms. Typical epoxy resins that can be used herein are disclosed in U.S. 2,467,171; U.S. 2,506,486; U.S. 2,581,-464 and U.S. 2,640,037. Typical of the phenol-formaldehyde resins that can be employed herein are those disclosed in U.S. 2,839,434. Suitable melamine-formaldehyde resins can be prepared by reacting 1 mol of melamine with at least 3 mols of formaldehyde. If desired, minor amounts of other compounds containing amino hydrogen atoms, e.g., aryl sulfonamide, can be reacted therewith. Preferably, the melamine-formaldehyde resins are etherified with monohydric alcohols containing 1–6 and more especially 3–6 carbon atoms. The urea-formaldehyde resins are condensation products of 1 mol of urea with about 2 mols of formaldehyde and preferably are etherified with monohydric alcohols containing 1–6 and more especially 3–6 carbon atoms.

The protective coating compositions of interest ordinarily will comprise 20–70% of the mixture of film-forming polymers dissolved in a suitable organic solvent such as hydrocarbons, alcohols, ethers, ketones, esters, and mixtures thereof, e.g., xylol-butanol and aliphatic hydrocarbon-butanol mixtures. Pigments, driers and other conventional ingredients may be included in the coating compositions. Such compositions usually will be formulated to have a total solids content of about 40–60%.

The coating compositions of the invention may be advantageously employed to protect wooden, paper, plastic and metal surfaces, e.g., steel, aluminum, copper, etc. The coating compositions may be applied to the surfaces to be protected by conventional methods of application such as brushing, spraying, roll coating, dipping, etc. The films may be cured by heating for short periods of time at 180–400° F.

EXAMPLE VI

A coating composition is prepared by dissolving 4 parts of the terpolymer of Example I and 2 parts of a tetrapropyl ether of tetramethylol melamine in 4 parts of a 50/50 xylol-butanol solvent mixture. Films of this coating composition are cast on tin plate, air-dried and cured by heating for 20 minutes at 300° F. The resulting films are hard, have excellent adhesion to the tin plate and excellent xylol resistance.

EXAMPLE VII

Part A

A quantity of the terpolymer of Example I which contains 1 molar equivalent of hydroxyl groups is esterified with 0.5 molar equivalent of linseed oil fatty acids.

Part B

A series of coating compositions are prepared which contain as the film-forming polymers a mixture of the esterified terpolymer of Part A above and, respectively, an alkyd resin, an epoxy resin, a urea-formaldehyde resin, a melamine-formaldehyde resin, a mixture of an alkyd resin and a melamine-formaldehyde resin, and a mixture of an alkyd resin and a urea-formaldehyde resin. The formulations of the coating compositions are set forth in Table I.

TABLE I

| Component | Coating Composition | | | | | |
|---|---|---|---|---|---|---|
| | A | B | C | D | E | F |
| Resin of Example VII, part A | 15 | 15 | 15 | 15 | 10 | 10 |
| Alkyd Resin | 15 | | | | 10 | 10 |
| Epoxy Resin | | 15 | | | | |
| Urea-Formaldehyde Resin | | | 15 | | | 10 |
| Melamine-Formaldehyde Resin | | | | 15 | 10 | |
| Titanium Dioxide | 25 | 25 | 25 | 25 | 25 | 25 |
| Butanol | 5 | 5 | 5 | 5 | 5 | 5 |
| Xylol | 40 | 40 | 40 | 40 | 40 | 40 |

The alkyd resin included in the above compositions consists of a blend of two parts by weight of a glyceryl phthalate resin modified with 35 weight percent of coconut oil fatty acids and 1 part by weight of a glyceryl phthalate resin modified with 40 weight percent of soybean oil fatty acids. The epoxy resin is a commercially available resin sold under the trade name Epon 1001. The urea-formaldehyde resin is a commercially available butyl ether of dimethylol urea and the melamine-formaldehyde resin is the butyl ether of tetramethylol melamine.

Films of each of the above described coating compositions are spray-coated onto clean panels of cold rolled steel and cured by heating for twenty minutes at 300° F. The cured films are hard and durable.

The above descriptions and particularly the examples are set forth by way of illustration only. Many other variations and modifications thereof will be apparent to those skilled in the art and can be made without departing from the spirit and scope of the invention herein described.

This application is a continuation in part of our copending application, S.N. 592,491, filed June 20, 1956.

What is claimed is:

1. A protective coating composition comprising an organic solvent solution of a resin mixture consisting essentially of 10–90% by weight of a terpolymer resin and, correspondingly, 90–10% by weight of a coating resin of the group consisting of an alkyd resin, an epoxy resin, a phenol-formaldehyde resin, a urea-formaldehyde resin, a melamine-formaldehyde resin, and mixtures thereof; said terpolymer resin being selected from the group consisting of (a) a terpolymer of monomers consisting of (1) 1–40% by weight of an allyl alcohol compound of the group consisting of allyl alcohol, methallyl alcohol and mixtures thereof, (2) 30–95% by weight of a vinyl ester of a 1–20 carbon atom monocarboxylic acid that is free of olefinic and acetylenic unsaturation, and (3) 1–50% by weight of an alpha, beta-ethylenically unsaturated monocarboxylic acid and (b) an ester formed from a terpolymer of (a) and 10-80% by weight of a stoichiometrically equivalent quantity of a monobasic fatty acid containing 12–20 carbon atoms in its structure.

2. A coating composition as in claim 1 wherein the resin mixture consists essentially of 50–90% by weight of the terpolymer resin and, correspondingly, 50–10% by weight of the coating resin.

3. A coating composition as in claim 1 in which the coating resin is an alkyd resin.

4. A coating composition as in claim 1 in which the coating resin is an alkyd ether of a methylol melamine.

5. A coating composition as in claim 1 in which the coating resin is an alkyl ether of a methylol urea.

References Cited in the file of this patent

UNITED STATES PATENTS

| | | |
|---|---|---|
| 2,263,598 | Stark et al. | Nov. 25, 1941 |
| 2,476,936 | Whetstone | July 19, 1949 |
| 2,557,266 | Dittmarr et al. | June 19, 1951 |
| 2,605,257 | Wolf et al. | July 29, 1952 |
| 2,651,626 | De Nie | Sept. 8, 1953 |
| 2,681,897 | Frazier et al. | June 22, 1954 |
| 2,795,573 | Barr et al | June 11, 1957 |